United States Patent [19]

Bennett

[11] Patent Number: 5,743,064
[45] Date of Patent: Apr. 28, 1998

[54] PROTECTIVE WALL RAIL HAVING DECORATIVE VINYL STRIP

[75] Inventor: Matthew Bennett, New Berlin, Wis.

[73] Assignee: InPro Corporation (IPC), Muskego, Wis.

[21] Appl. No.: 579,224

[22] Filed: Dec. 28, 1995

[51] Int. Cl.$^6$ ..................................................... E04F 19/02
[52] U.S. Cl. .................. 52/718.04; 52/312; 52/716.1; 52/716.6; 52/717.04; 256/59; 256/66; 256/DIG. 6; 428/31; 428/100
[58] Field of Search ........................... 52/716.1, 716.5, 52/716.6, 716.7, 716.8, 311.1, 312, 313, 717.04, 717.05, 718.01, 718.04; 256/59, 66, DIG. 6; 428/31, 77, 79, 100

[56] References Cited

U.S. PATENT DOCUMENTS

| | | |
|---|---|---|
| Re. 34,590 | 4/1994 | Schotthoefer . |
| 3,013,919 | 12/1961 | Bialy . |
| 3,458,386 | 7/1969 | Shanok et al. . |
| 3,737,972 | 6/1973 | Smoot ............................... 52/716.7 X |
| 3,745,056 | 7/1973 | Jackson ............................... 428/31 X |
| 3,811,989 | 5/1974 | Hearn . |
| 3,825,229 | 7/1974 | Bartlett et al. ........................... 256/59 |
| 3,842,564 | 10/1974 | Brown ............................... 256/59 X |
| 3,861,110 | 1/1975 | Bartlett ............................... 52/718.05 |
| 4,090,906 | 5/1978 | Zoller . |
| 4,172,745 | 10/1979 | Van Manen . |
| 4,196,552 | 4/1980 | Bartlett ............................... 256/59 X |
| 4,200,261 | 4/1980 | Bartlett ............................... 256/59 |
| 4,329,196 | 5/1982 | Rawlinson . |
| 4,399,142 | 8/1983 | Durant et al. . |
| 4,784,711 | 11/1988 | Larsson . |
| 4,786,350 | 11/1988 | Nesbitt et al. . |
| 4,787,175 | 11/1988 | Adell . |
| 4,946,727 | 8/1990 | Kessler ............................... 428/31 X |
| 5,028,288 | 7/1991 | Schotthoefer . |
| 5,203,941 | 4/1993 | Spain et al. . |
| 5,226,998 | 7/1993 | Few . |
| 5,273,258 | 12/1993 | Bedics ............................... 256/59 |
| 5,281,290 | 1/1994 | Bosler . |
| 5,283,096 | 2/1994 | Greenberg et al. ............................... 52/716.6 X |
| 5,288,048 | 2/1994 | Shreiner ............................... 256/59 X |
| 5,326,520 | 7/1994 | Franck et al. . |
| 5,353,571 | 10/1994 | Berdan et al. ............................... 52/716.7 X |
| 5,469,682 | 11/1995 | Knight ............................... 52/717.05 X |

FOREIGN PATENT DOCUMENTS 286611  8/1928  United Kingdom ............... 52/716.6

OTHER PUBLICATIONS

"The Capabilities" Borden Decorative Products (10 pages) 1994.

Primary Examiner—Wynn E. Wood
Assistant Examiner—Kevin D. Wilkens
Attorney, Agent, or Firm—Nilles & Nilles, S.C.

[57] ABSTRACT

A protection system comprises a protective wall rail, such as a handrail or a guardrail, which is made of an extruded thermoplastic sheet and which is thermoformably bonded to a decorative vinyl film. The vinyl film has a decorative pattern on one of its surfaces. The protective wall rail is mounted to a wall forming part of a building by a suitable bracket and retainer. If the protective wall rail is a guardrail, then it may be used for protecting the wall from being damaged by a movable object. If the protective wall rail is a handrail, then it may be used for securing the movement of an human through the building. The protective wall rail advantageously exhibits improved aesthetic quality and improved durability.

4 Claims, 5 Drawing Sheets

PROTECTIVE WALL RAIL HAVING DECORATIVE VINYL STRIP

FIELD OF THE INVENTION

The present invention relates generally to protective wall rails, and in particular relates to protective wall rails having decorative vinyl strips.

DESCRIPTION OF RELATED ART

Protective wall rails are well known for providing protection to walls and persons in industrial facilities such as factories, offices, hospitals and nursing homes. The generic term "protective wall rail" refers to protective rails, such as guardrails and handrails, that get mounted to a wall. In a variety of situations, it is preferable for these devices to encompass both functional and aesthetic features.

For example, it is often desirable to provide the walls of an industrial facility with guardrails to protect against everyday wear and tear that might otherwise have to be endured. As movable objects are transported about the facility, for example, the objects are likely to strike the wall. Hence, without protection, the walls eventually become scratched and dented. To avoid this, guardrails may be installed which protect the walls against such wear and tear. Since the guardrails are used to prevent degradation of the aesthetic quality of the facility (i.e., by preventing wear and tear), it is desirable that the guardrails do not themselves degrade the aesthetic quality of the facility.

Similarly, protective wall rails may also be used which protect patrons of institutional facilities instead of the facility itself. For example, in a nursing home, it is desirable to provide the hallways with handrails which may be used by residents to secure their movement about the nursing home. Of course, such handrails have long been known. Until now, however, not much attention has been paid to the aesthetic quality of safety-oriented devices for impaired persons, such as handrails. With the recent increase in the number of people living in nursing homes and similar facilities, a new interest has arisen in enhancing the aesthetic quality of these products.

It has been found that thermoplastic materials, such as polyvinyl chloride (PVC), are rugged materials which, functionally speaking, are excellent for making protective wall rails. Where aesthetic quality is also important, it is desirable to enhance in some manner the aesthetic quality of protective wall rails that comprise thermoplastic material. To date, however, an acceptable method of enhancing the aesthetic quality of these protective wall rails has not been discovered.

SUMMARY OF THE INVENTION

A wall protection system having improved aesthetic quality is presented. Specifically, a wall protection system according to the present invention comprises a protective wall rail, such as a handrail or a guardrail, which is made of an extruded thermoplastic sheet that is thermoformably bonded to a decorative vinyl film. The protective wall rail is mounted to a wall forming part of a building by a suitable retainer or bracket. If the protective wall rail is a guardrail, then it may be used for protecting the wall from being damaged by a movable object. If the protective wall rail is a handrail, then it may be used for securing the movement of an human through the building.

The vinyl film has a decorative pattern on one of its surfaces. The decorative pattern may be chosen such that it is color coordinated with the thermoplastic material and matches the remainder of the hallway/room in which the protective device is installed.

A method of manufacturing a protective wall rail comprises the steps of extruding a continuous strip of thermoplastic material through an extruder die, thermoformably bonding a decorative vinyl film having a patterned face onto a surface of the extruded thermoplastic material, shaping the extruded thermoplastic material having the decorative vinyl strip thermoformably bonded thereon so as to form the protective wall rail, cooling the protective wall rail to increase the rigidity thereof, and supplying the protective wall rail with a retainer for mounting the protective wall rail to a wall of a building. The bonding step further includes the steps of passing the decorative vinyl film through a roller assembly while the extruded thermoplastic material is at a thermoformable temperature above ambient temperature, and introducing the decorative vinyl film onto a surface of the extruded thermoplastic material.

The present invention enjoys several advantages. First, the thermoformal bonding process produces a durable final product, and gives the vinyl film excellent structural integrity. The thermoplastic material is sufficiently rugged to protect itself and the vinyl film against denting. Additionally, vinyl film which is thermobonded to thermoplastic material is generally not subject to chipping, scratching or tearing and will not delaminate due to temperature changes, wear and age. Also, the thermoformed bond between the decorative vinyl film and the thermoplastic material eliminates the lumpiness associated with other types of bonds (such as adhesive bonds). Finally, as compared to the thermoplastic material alone, the vinyl film adds to the overall aesthetic quality of the room in which the protective device is installed.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Detailed Description of Preferred Protective Wall Rails

Figure 1A:
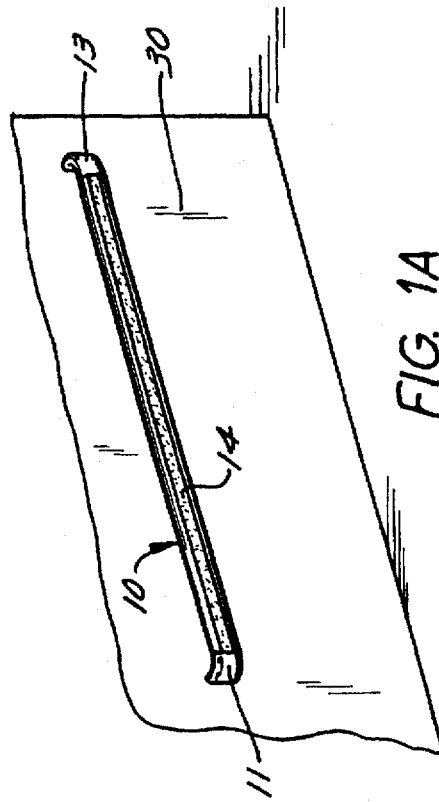
FIG. 1A is a perspective view of a protective handrail having a vinyl film thermoformably bonded thereon mounted to a wall.
Figure 1B:
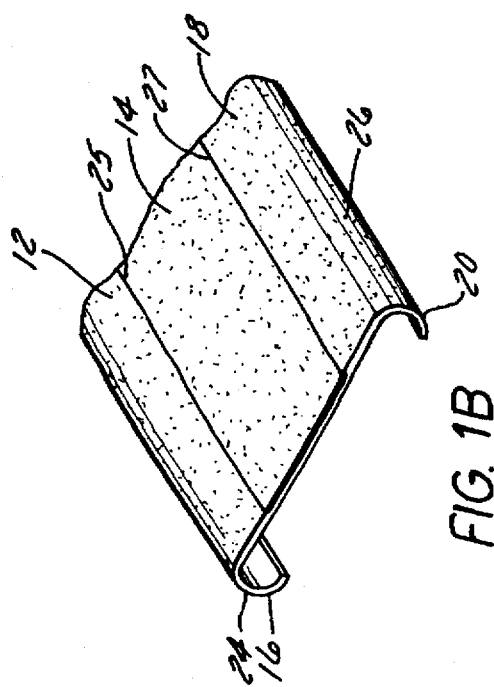
FIG. 1B is a perspective view of the protective handrail.
Figure 1D:
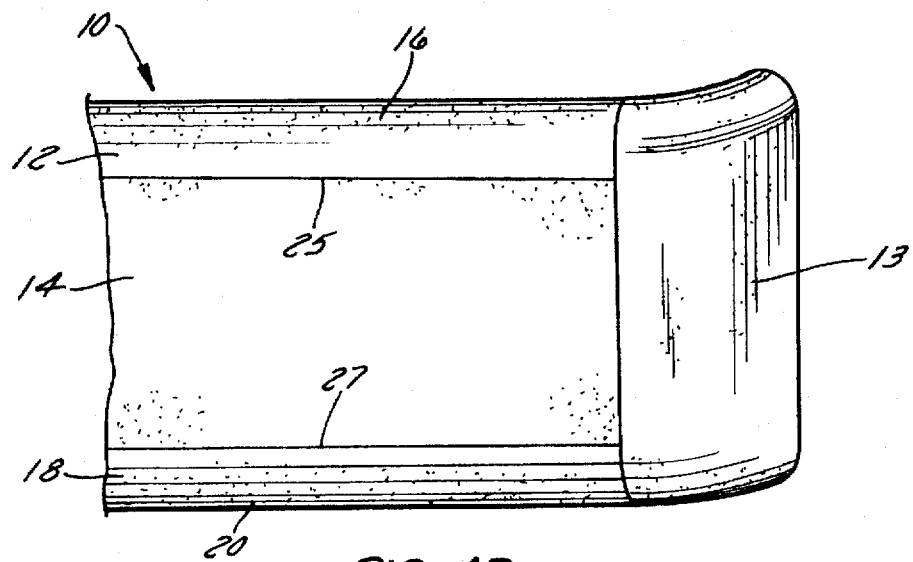
FIG. 1D is a side perspective view of the protective handrail.
Figure 1C:
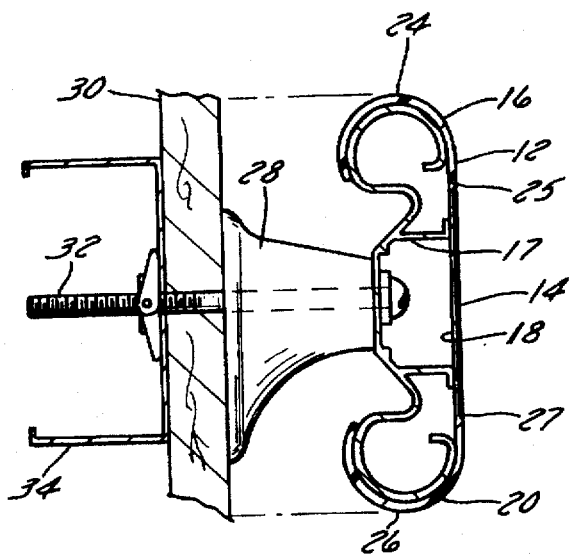
FIG. 1C is a cross sectional view of the protective handrail.
Figure 1E:
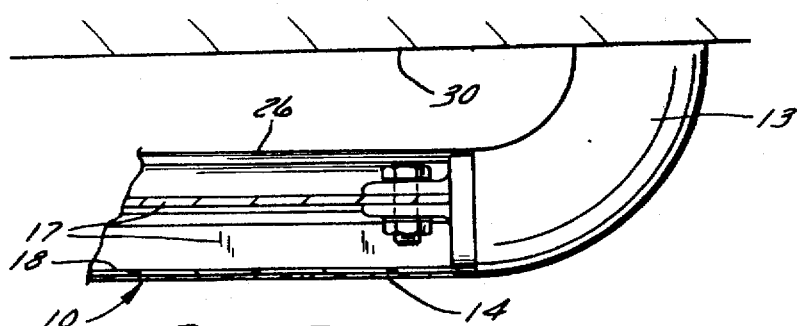
FIG. 1E is a top view of the protective handrail, all in accordance with the present invention.
Figure 2C:
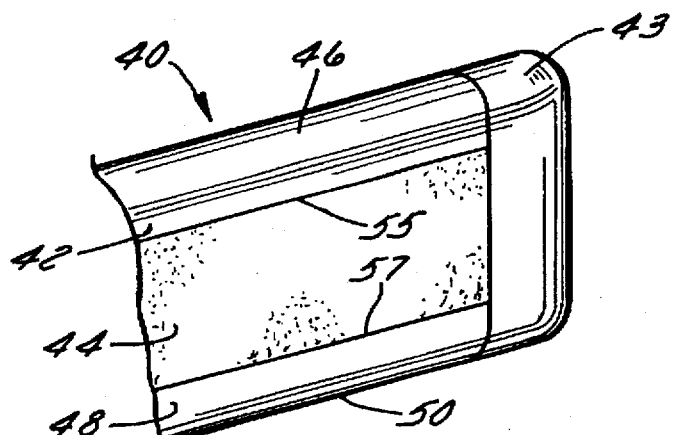
FIG. 2C is a side perspective view of the protective guardrail, all in accordance with the present invention.
Figure 2B:
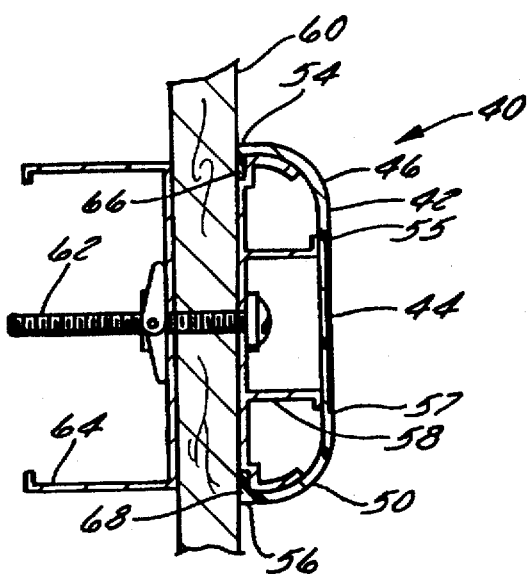
FIG. 2B is a cross sectional view of the protective guardrail.
Figure 2A:
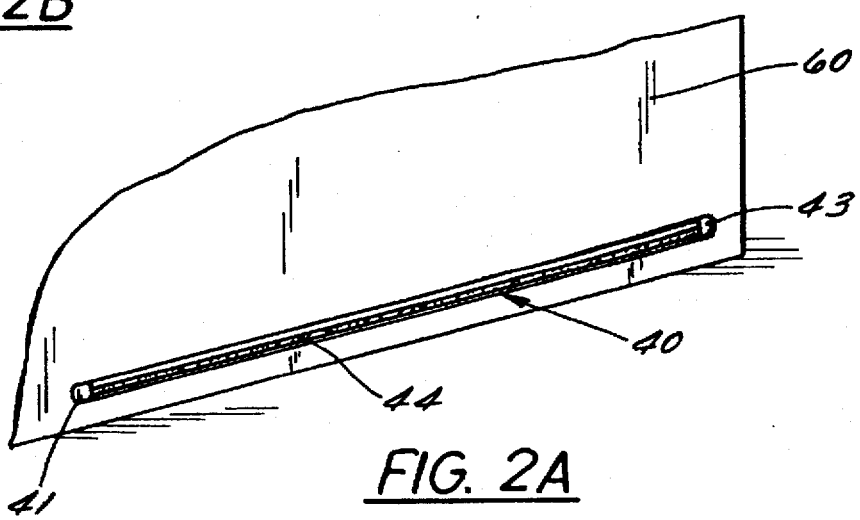
FIG. 2A is a perspective view of a protective guardrail having a vinyl film thermoformably bonded thereon mounted to a wall.

Referring now to the figures, two exemplary protective wall rails according to the present invention are illustrated in FIGS. 1A–1E and in FIGS. 2A–2C, respectively.

Specifically, in FIGS. 1A–1E, a protective handrail 10 for a wall 30 is illustrated. The handrail 10, which may be used for securing the movement of a person through a building, comprises a thermoplastic sheet 12 having a top portion 16, a side portion 18, and a bottom portion 20. The protective handrail further comprises a vinyl film 14 which is thermoformably bonded to the side portion 18. The thermoformal bonding process is described in greater detail below in conjunction with the discussion of FIGS. 3–4C.

The vinyl film 14 is patterned on one surface and preferably is color coordinated with the color of the thermoplastic sheet 12 and/or with the color of the hallway in which the handrail 10 is installed. (Conceivably, the vinyl film 14 could have a pattern on both surfaces. However, unless the thermoplastic sheet 12 is not opaque, there is little reason to have a pattern on both surfaces of the vinyl film 14, since only one surface is visible.) Of course, the number of different potential patterns and colors which could be used in conjunction with the vinyl film 14 is virtually unlimited. It may also be desirable to have a pattern embossed in the vinyl film 14 and/or the thermoplastic sheet 12. For example, if the vinyl film 14 is decorated with a wood pattern, then the surface beneath the vinyl film 14 could be embossed so as to make the wood pattern three dimensional. Preferably, the vinyl film 14 is semi-rigid has a width in the range of 1'to 5", and is about 0.004" to 0.008" thick, and even more preferably about 0.006" thick.

The vinyl film 14 has upper and lower edges 25 and 27, respectively. Similarly, the thermoplastic sheet 12 has upper and lower edges 24 and 26. (The upper edge 24 is the uppermost edge of the top portion 16 of the thermoplastic sheet 12; and the lower edge 26 is the lowermost edge of the bottom portion 20 of the thermoplastic sheet 12.) Preferably, the width of the vinyl film 14 is substantially less than the width of the thermoplastic sheet 12. Further, the vinyl film 14 is preferably mounted such that the edges 25 and 27 of the vinyl film 14 are parallel with, and substantially spaced from, the upper and lower edges 24 and 26, respectively, of the thermoplastic sheet 12. Hence, the surface of the thermoplastic sheet 12 is partially adorned (i.e., with the vinyl film 14) and partially unadorned. It has been found that such an arrangement presents an especially attractive image.

Figure 4A:
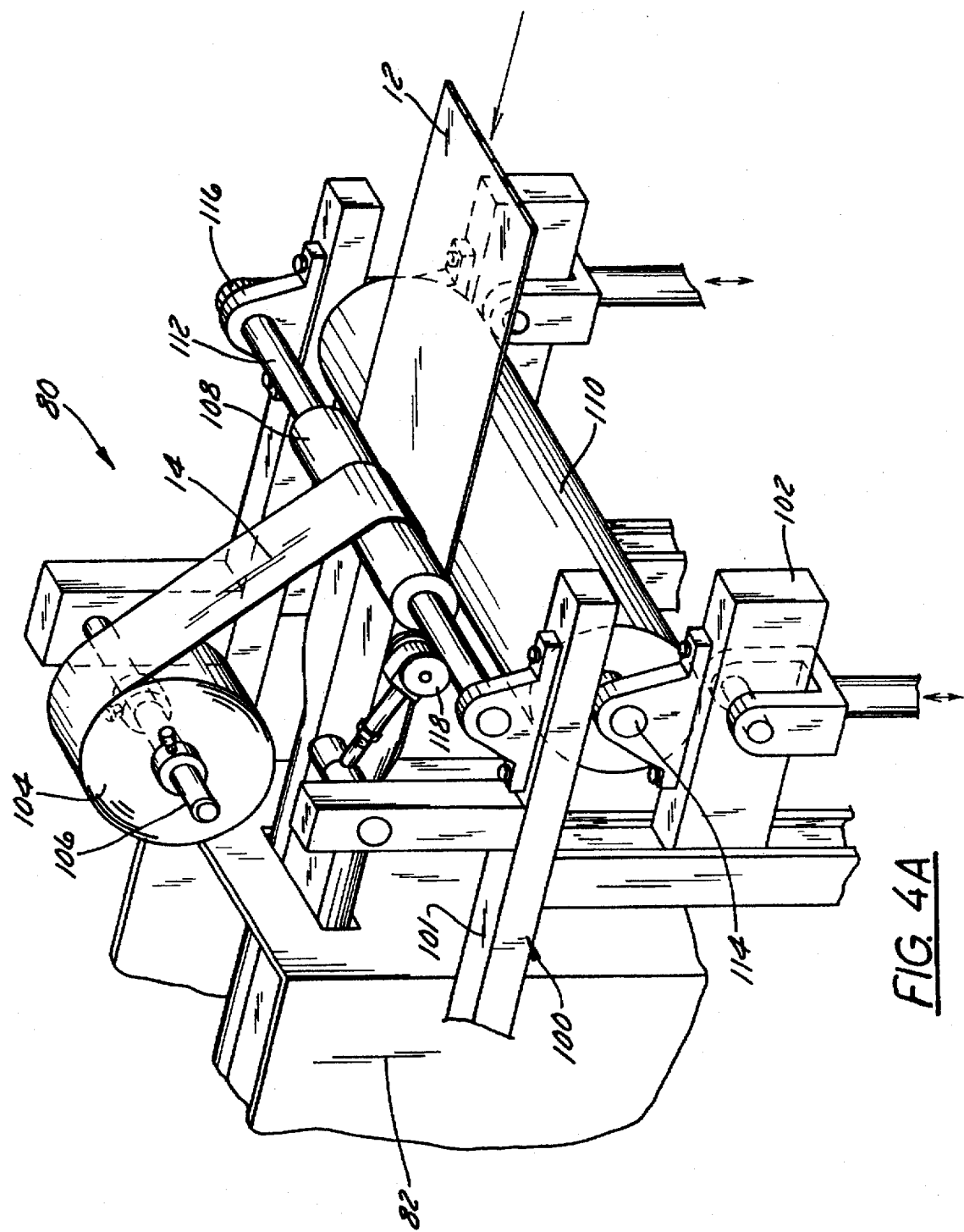
FIG. 4A is a perspective view of a roller assembly which is used in conjunction with the system illustrated in FIG. 3 to center a decorative vinyl film on extruded thermoplastic material.
Figure 4B:
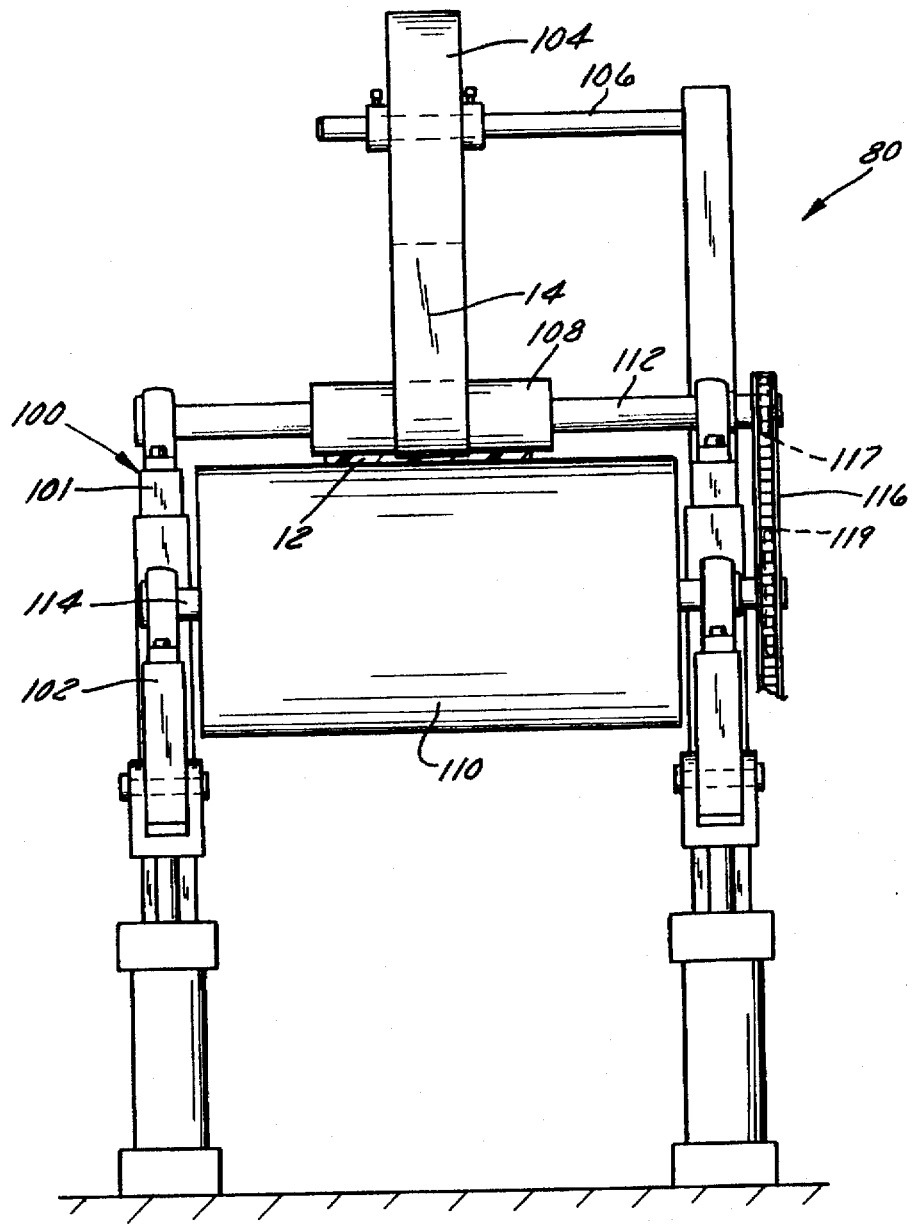
FIG. 4B is a frontal view of the roller assembly.
Figure 4C:
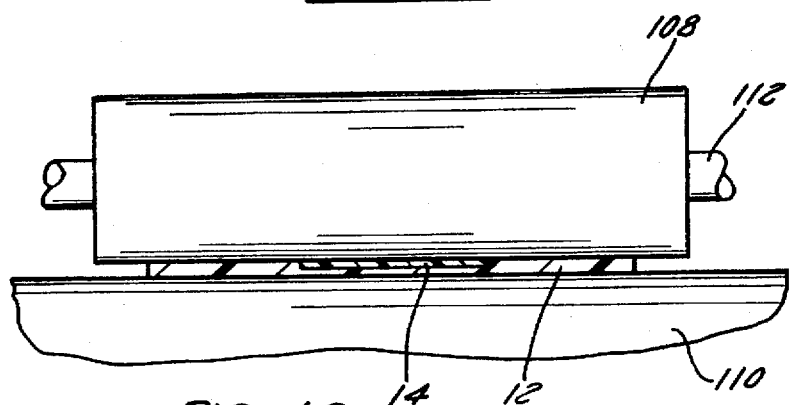
FIG. 4C is a close-up frontal view of a protective handrail passing through the roller assembly, all in accordance with the present invention.

It should be noted that, with this arrangement, the placement of the vinyl film 14 on the thermoplastic sheet 12 is important. In particular, the entire length of the handrail 10 may be viewed at one time by a person who is standing at an end of a hallway. (In other words, the person's eye does not need to shift along the length of the rail. The entire length is within the person's line of sight when the person is standing at one end of the hallway.) Hence, if the vinyl film 14 is not properly mounted (i.e., straight and parallel) on the thermoplastic sheet 12, it is very easy to detect the imperfections. FIGS. 4A–4C, discussed in greater detail below, depict a roller assembly which can be used to place the vinyl film 14 on the thermoplastic sheet 12.

The thermoplastic sheet 12 is slidably mounted to a retainer 17, which is preferably made of aluminum. As illustrated in FIG. 1C, the top and bottom portions 16 and 20 of the thermoplastic sheet 12 are curved so as to define greater than one half of a semicircle. This feature, taken in conjunction with the rigidity of the thermoplastic sheet 12, permits the thermoplastic sheet 12 to be securely retained on the retainer 17 once the thermoplastic sheet 12 is slid over the retainer 17.

The retainer 17 provides the thermoplastic material 12 with additional structural support, thereby increasing the overall strength and durability of the handrail 10. As illustrated in FIG. 1C, the retainer 17 has a cross-sectional shape which generally corresponds to the cross-sectional shape of the thermoplastic material 12. As a result, the retainer 17 is able to reinforce the thermoplastic material 12.

The bracket 28 mounts the retainer 17, and thus the handrail 10, to the wall 30. This is achieved by a bolt assembly 32 which bolts the bracket 28 to a conventional steel stud 34 or similar device (such as a wooden stud). The bracket 28 mounts the handrail 10 to the wall 30 at roughly waist-height. (The precise height, however, may be dictated by building code.) Of course, situations can be imagined where the retainer 17 and the bracket 28 may be integrated into a one-piece device in which case the device is simply referred to as a retainer.

Finally, to complete the handrail 10, return pieces 11 and 13 are used which give the handrail 10 a finished appearance. Typically, during the manufacturing process, a long continuous sheet of thermoplastic material is extruded which is then cut to length. However, the fact that the surface has been cut gives it a different appearance than the remaining uncut surface. This different appearance presents an unattractive image. Therefore, return pieces 11 and 13 are used which give the handrail 10 a finished appearance by covering the exposed cut surface and by tapering the handrail 10 to the wall 30.

Discussing now the second type exemplary type of protective wall rail according to the present invention, FIGS. 2A–2C illustrate a protective guardrail 40 for a wall 60. The construction of the guardrail 40 is generally very analogous to the construction of the handrail 10. The principal difference between the guardrail 40 and the handrail 10 is the manner in which they are used. Specifically, whereas the handrail 10 is used to secure the movement of persons through a building, the guardrail 40 is used for protecting a wall from being damaged by a moving object. For example, if used in a hospital, the guardrail 40 may be used to protect a hospital wall from wheelchairs and equipment-bearing carts which are pushed about the hospital and which may collide with the wall. In both cases, however, the two devices are mounted to a wall and are designed to be durable as well as aesthetically pleasing.

The guardrail 40 comprises a thermoplastic sheet 42 having a top portion 46, a side portion 48, and a bottom portion 50. The guardrail 40 further comprises a vinyl film 44 which is thermoformably bonded to the side portion 48. The vinyl film 44 preferably has the same preferred features as the vinyl film 14. The vinyl film 44 is patterned on one surface and preferably is color coordinated with the color of the thermoplastic sheet 42 and/or with the color of the hallway in which the guardrail 40 is installed. Depending on the pattern used, it may also be desirable to have a pattern embossed in the vinyl film 44 and the thermoplastic sheet 42.

Preferably, the width of the vinyl film 44 is less than the width of the thermoplastic sheet 42. Further, the vinyl film 44 is preferably mounted such that it is parallel with, and substantially spaced from, upper and lower edges 54 and 56 of the thermoplastic sheet 42. Hence, the surface of the thermoplastic sheet 42 is partially adorned (i.e., with the vinyl film 44) and partially unadorned. As mentioned previously, it has been found that such an arrangement presents an especially attractive image.

The thermoplastic sheet 42 is slidably mounted to a retainer 58, which is preferably made of aluminum. As in the case of the retainer 17, the retainer 58 provides the thermoplastic material 12 with additional structural support, thereby increasing the overall strength and durability of the guardrail 40. The retainer 58 is also a bracket, i.e., to the extent that it mounts the guardrail 40 to the wall 50. (Unlike the handrail 10, however, a bolt assembly 62 bolts the retainer 58 to a stud 64 close to the floor, such as at a height of one foot.)

Unlike the top and bottom portions 16 and 20 of the thermoplastic sheet 12, the top and bottom portions 46 and 50 of the thermoplastic sheet 42 do not define one half of a semicircle, as illustrated in FIG. 2B. Rather, in this case, the top and bottom portions 46 and 50 are curved so as to define only one fourth of a semicircle. However, the thermoplastic sheet 42 is further bent at a right angle so that lateral ends 66 and 68 of the thermoplastic sheet 12 are parallel with the wall 60. (Unlike the handrail 10, the guardrail 40 may be flush against the wall 60, since there is generally no need for a person to grasp the guardrail 40.) As before, the thermoplastic sheet 42 is securely retained on the retainer 58 once the thermoplastic sheet 42 is slid over the retainer 58. Finally, return pieces 41 and 43 are also mounted to the wall and give the guardrail 40 a finished appearance by covering the exposed cut surface and by tapering the guardrail 40 to the wall 60.

Hence, both the handrail 10 and the guardrail 40 advantageously comprise a decorative vinyl film which is thermoformably bonded to thermoplastic material. The advantages to such an arrangement are threefold. First, as already discussed, the decorative vinyl film has a decorative pattern. The decorative pattern may be chosen such that it is color coordinated with the thermoplastic material and matches the remainder of the hallway/room in which the protective device is installed. Hence, as compared to the thermoplastic material alone, the vinyl film adds to the overall aesthetic quality of the room in which the protective device is installed.

Second, the thermoformal bonding process permits the vinyl film to be attached to the thermoplastic material in a manner which is aesthetically appealing. The vinyl film is bonded directly to the thermoplastic material. Therefore, there is no lumpiness in the final product which might be exhibited with other processes (e.g., such as using an adhesive glue).

Third, it has been found that the thermoformal bonding process produces a durable final product. The thermoformal bonding process gives the vinyl film excellent structural integrity. The thermoplastic material is sufficiently rugged to protect itself and the vinyl film against denting. Further, unlike a pattern which is painted onto the thermoplastic material for example, the vinyl film is generally not subject to chipping. Finally, the vinyl film which is also generally not subject to scratching or tearing and will not delaminate.

2. Detailed Description of Preferred Manufacturing Process

Figure 3:
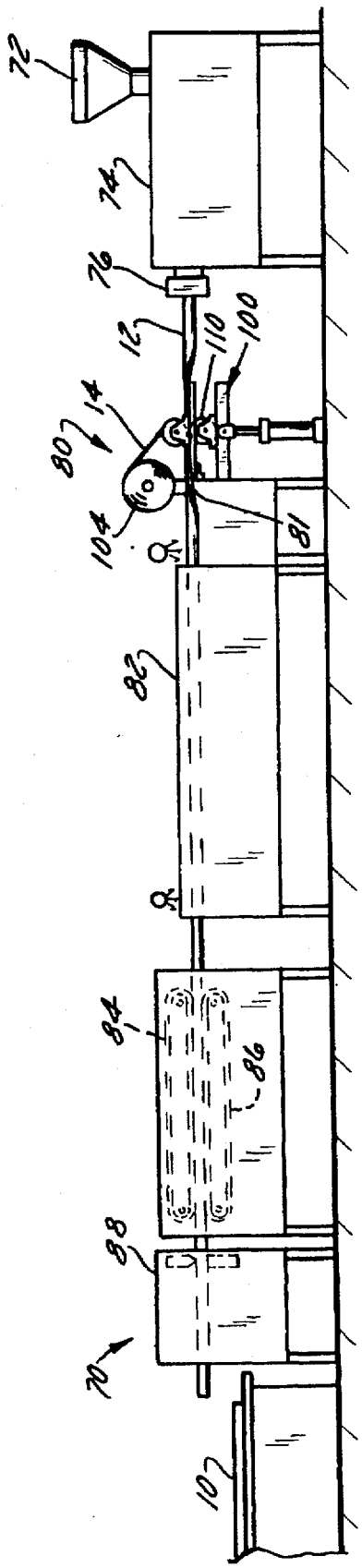
FIG. 3 is an extrusion system which can be used to manufacture a protective wall rail in accordance with the present invention.

FIG. 3 illustrates an extrusion system 70 which can be used to manufacture a protective wall rail in accordance with the present invention. The extrusion system 70 generally comprises a hopper 72, an extruder 74, and extruder die 76, a roller assembly 80, a cooling bath 82, endless belts 84 and 86, and a severing device 88.

The operation of the extrusion system 70, which will be discussed in terms of manufacturing the handrail 10, is as follows. The hopper 72 provides a supply of thermoplastic material to the extruder 74. The extruder 74 uses this material to form the thermoplastic sheet 12 which is extruded through an extruder die 76. As the thermoplastic sheet 12 exits the extruder die 76, it preferably has a temperature in the range of 310° F. to 340° F., and preferably a temperature of 325° F. The thermoplastic sheet 12 will nearly maintain this temperature as it makes contact with the rollers 108 and 110 of the roller assembly 80.

The thermoplastic sheet 12 exits the extruder die 76 as a flattened thermoplastic sheet 12 so that it may travel through the roller assembly 80. The roller assembly 80, which is illustrated in greater detail in FIGS. 4A–4C, is used to place the decorative vinyl film 14 on extruded thermoplastic sheet 12. The roller assembly comprises a frame 100 including a frame main portion 101 and a frame sub-portion 102, a vinyl film supply roller 104 mounted to the frame 100 by an axle 106, upper and lower rollers 108 and 110 mounted to the frame 100 by respective axles 112 and 114, gears 117 and 119 which couple the axles 112 and 114 together via a chain 116, and a rotational measuring device 118.

The lower roller 110 is mounted to the sub-portion 102 of the frame 100. The frame sub-portion 102 is vertically movable with respect to the frame main portion 101. This permits the distance between the surfaces of the rollers 108 and 110 to be adjusted, so that the pressure applied to the thermoplastic sheet 12 and the vinyl film 14 is also adjustable. Preferably, the upper and lower rollers 108 and 110 apply a pressure in the range of 80 PSI to 100 PSI to the thermoplastic material and the decorative vinyl film 14, and preferably a pressure of 90 PSI.

In addition to controlling the pressure between the rollers 108 and 110, the temperature of the rollers is also controlled. Specifically, the rollers 108 and 110 are maintained at a temperature in the range of 100° F. to 140° F., and preferably are at a temperature of 120° F.

The vinyl film 14 is released by the vinyl film supply roller 104 and passes between the upper and lower rollers 108 and 110 along with the thermoplastic sheet 12. By virtue of the fact that the thermoplastic sheet 12 is in a partially molten phase as it passes between the rollers 108 and 110, and by virtue of the fact that the rollers apply pressure to the thermoplastic sheet 12 and the vinyl film 14, the vinyl film 14 is thermoformably bonded to the thermoplastic sheet 12. Hence, the thermoformal bonding process makes it possible to mount the vinyl film 14 to the thermoplastic sheet 12 without the use of adhesives.

The decorative pattern is located on the lower surface of the vinyl film 14 as it is rolled on the supply roller 104. The upper surface may be plain-faced. Hence, when the vinyl film is applied to the thermoplastic sheet 12, the patterned surface of the vinyl film 14 is exposed whereas the plain surface is bonded to the thermoplastic sheet 12.

The upper roller 108 may also be used to emboss the thermoplastic sheet 12 with a pattern. For example, if the vinyl film 14 is decorated with a wood pattern, the thermoplastic material may be embossed to make the wood pattern three dimensional.

The axles 112 and 114 of the rollers 108 and 110, respectively, are coupled together by the chain 116. The gears 117 and 119 on the axles 112 and 114 are selected such that the outer surfaces of the rollers 108 and 110 travel at the same rate. As a result there is no slippage between either of the rollers 108 and 110 and the thermoplastic material 12. Further, the roller assembly 80 includes a rotational measuring device 118, which monitors the movement of the rollers 108 and 110 so that it may be coordinated with the movement of the endless belts 84 and 86 downstream.

Once the thermoplastic sheet 12 and vinyl film 14 travel through roller assembly 80, they pass through a sizer 81. Upon passing through the sizer 81, the thermoplastic sheet 12 is formed into the final shape of the handrail 10.

The thermoplastic sheet 12 and the vinyl film 14 then pass through a cooling bath 82. The cooling of the thermoplastic sheet 12 imparts rigidity to the thermoplastic sheet 12. Of course, the length of the cooling bath will depend upon various process parameters such as the specific thermoplastic material used, the speed of the substrate as it passes through the cooling bath 82 and the relative temperature of the water in the cooling bath 82.

After the thermoplastic material 12 and the vinyl film 14 pass through the cooling bath 82, they pass through the endless belts 84 and 86. As indicated above, a control system which controls the endless belts 84 and 86 is coupled to the rotational measuring device 118, so that the speed of the belt 84 and 86 can be coordinated with the speed of the rollers 108 and 110. Finally, the thermoplastic material 12 and vinyl strip 14 pass through a severing device 88 which cuts the thermoplastic material to the desired length of the handrail 10.

Many changes and modifications could be made to the invention without departing from the spirit thereof. The scope of these changes will become apparent from the appended claims.

We claim:

1. A protective wall rail comprising:

an extruded thermoplastic sheet comprising upper and lower edges and an unnotched planar side portion disposed between said upper and lower edges, said extruded thermoplastic sheet having a textured pattern embossed onto an exposed surface of said side portion, and said side portion of said thermoplastic sheet having a width defined by a distance between said upper and lower thermoplastic sheet edges;

a decorative vinyl film having a decorative pattern thereon, said decorative vinyl film being thermoformably bonded to the exposed surface of said unnotched planar side portion of said extruded thermoplastic sheet, the thermoformed bond between said decorative vinyl film and said thermoplastic sheet being free of adhesives, said decorative vinyl film comprising upper and lower edges, said decorative vinyl film having a width defined by a distance between said upper and lower decorative vinyl film edges, said decorative vinyl film width being substantially less than said side portion of said thermoplastic sheet width, and said decorative vinyl film being thermoformably bonded onto said side portion of said extruded thermoplastic sheet (1) such that said upper and lower edges of said decorative vinyl film (a) are substantially spaced from, (b) are disposed between, and (c) are parallel with, said upper and lower edges of said side portion, (2) such that a patterned face of said decorative vinyl film is left exposed, and (3) such that the textured pattern embossed on said extruded thermoplastic sheet gives said decorative pattern on said decorative vinyl film a three-dimensional appearance;

a retainer, said retainer being slidably mounted to said extruded thermoplastic sheet, and said retainer adapted to be fastened to a wall thereby mounting said protective wall rail to said wall, and said retainer defining means for structurally reinforcing said protective wall rail;

and wherein said protective wall rail defines one of (1) guardrail means for protecting said wall from being damaged by a movable object and (2) handrail means for securing the movement of a human through along said protective wall rail.

2. The protective wall rail according to claim 1, wherein said decorative vinyl film is semi-rigid.

3. The protective wall rail according to claim 1, wherein said width of said decorative vinyl film is in the range of 1 inch to 5 inches, and wherein said decorative vinyl film is in the range of 0.004 and 0.008 inches thick.

4. A protective wall rail comprising:

an extruded thermoplastic sheet having a top portion terminating in an upper edge, a substantially planar unnotched side portion, a bottom portion terminating in a lower edge, and a textured pattern embossed on an exposed surface of said side portion;

a decorative vinyl film having a decorative pattern on a face thereof and having upper and lower edges, said decorative vinyl film 1) being thermoformably bonded, without adhesives, to the exposed surface of said unnotched side portion of said extruded thermoplastic sheet, 2) having a width which is substantially less than a width of said side portion of said extruded thermoplastic sheet, and 3) having a thickness of 0.004 to 0.008 inches, and said decorative vinyl film being thermoformably bonded onto said side portion of said extruded thermoplastic sheet (1) such that said upper and lower edges of said decorative vinyl film (a) are substantially spaced from, (b) are disposed between, and (c) are parallel with, said upper and lower edges of said side portion, (2) such that the patterned face of said decorative vinyl film is left exposed, and (3) such that the textured pattern embossed on said extruded thermoplastic sheet gives said decorative pattern on said decorative vinyl film a three-dimensional appearance;

a retainer which is mountable on a wall and on which said extruded thermoplastic sheet is mounted;

and wherein said protective wall rail defines one of (1) guardrail means for protecting said wall from being damaged by a movable object and (2) handrail means for securing the movement of a human through along said protective wall rail.

* * * * *